3,184,964
THRUST MEASURING DEVICE
William S. Hedrick, Spring Park, and John H. Wastvedt, Minneapolis, Minn., assignors to FluiDyne Engineering Corporation, Minneapolis, Minn., a corporation of Minnesota
Filed May 15, 1961, Ser. No. 110,073
14 Claims. (Cl. 73—141)

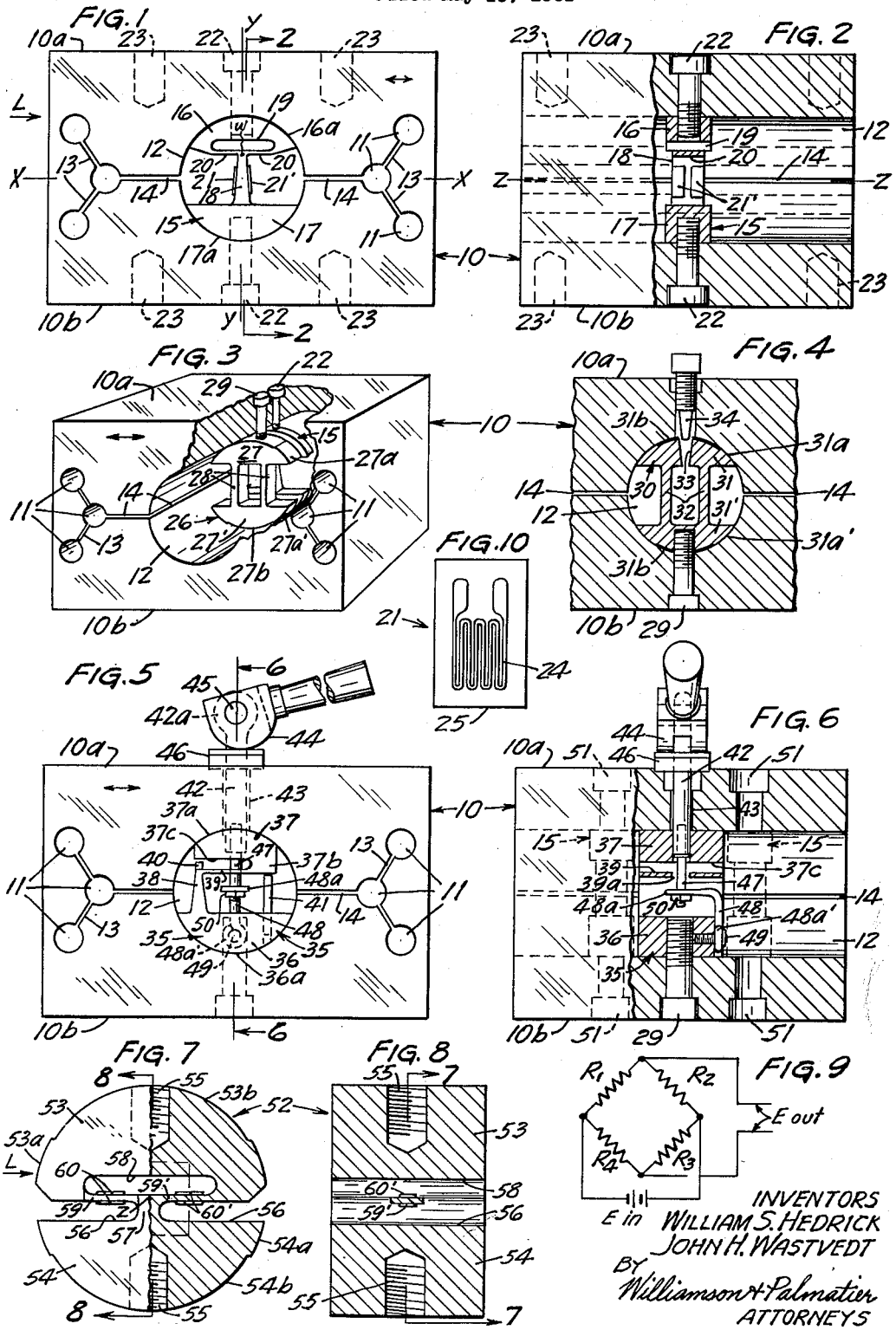
May 25, 1965    W. S. HEDRICK ETAL    3,184,964
THRUST MEASURING DEVICE
Filed May 15, 1961
INVENTORS
WILLIAM S. HEDRICK
JOHN H. WASTVEDT
BY Williamson + Palmatier
ATTORNEYS ; # United States Patent Office 3,184,964
Patented May 25, 1965

This invention relates to devices for measuring force and particularly to devices for measuring a single component of force or thrust in one plane and one direction only.

The purpose of this invention is to devise an extremely sensitive and accurate force measuring device or force balance capable of measuring both large and small forces ranging from as little as 40 pounds or less to as large as 20,000 pounds and more.

A further object is to provide a force measuring device of the type described which is capable of very accurately measuring large forces with a minimum of deflection and to provide exceedingly high accuracy by eliminating inaccuracies due to misalignment and to forces directed against the device from directions other than that desired to be measured.

Still another object is to provide a force measuring device of the type described which is relatively simple in design and inexpensive in construction and utilizes a minimum number of parts, and is capable of a high degree of accuracy and is further capable of repeatability of load detection, has high frequency response and which assures long life of the device with low maintenance costs.

A more specific object of this invention is to provide a parallelogram type flexure or balance which is more subject to deformation under load in one plane than in any other, in combination with strain elements responsive to said deformation and means for measuring said strain.

Another more specific object is to provide a force measuring device of the type above described and means for selectively varying or extending the measuring range of the device.

These and other objects and advantages of our invention will more fully appear from the following description made in connection with the accompanying drawings wherein like reference characters refer to the same or similar parts throughout the several views, and in which:

FIG. 1 is a side elevational view of one force balance of this invention;

FIG. 2 is an end view of FIG. 1, with a portion thereof shown in vertical section as taken approximately along the line 2—2 of FIG. 1;

FIG. 3 is a perspective view of another force balance of this invention utilizing a stiffening flexure element for extending the range of the unit, with a portion broken away for clarity of understanding;

FIG. 4 is a partial side view in vertical section of a force balance utilizing another type of stiffening element for extending the range of measurement;

FIG. 5 is a side elevational view of a force balance utilizing still another type of stiffening flexure element for extending the range of measurement;

FIG. 6 is an end view of FIG. 5 with a portion thereof in vertical section taken approximately along the line 6—6 of FIG. 5;

FIG. 7 is a side view of an alternate form of strain element with a portion thereof in vertical section as taken along the line 7—7 of FIG. 8;

FIG. 8 is a vertical sectional view of the strain element of FIG. 7 taken along the line 8—8 of FIG. 7;

FIG. 9 is a schematic diagram of the bridge circuit used to measure the load; and FIG. 10 is a detail view on an enlarged scale of a typical strain gauge.

Reference is now made to the accompanying drawings for a more complete description of the invention.

The force measuring device or force balance shown in the accompanying drawings comprises a parallelogram type flexure block 10 machined from a solid block of rigid material, preferably steel, which block is symmetrical with respect to each of its center lines which are identified as follows: X—X (longitudinal); Y—Y (vertical) and Z—Z (transverse). The block is bored through from side to side to provide the small transversely disposed holes 11 located in triangular groups adjacent each end of the block 10 and to provide the large transverse center hole 12 which is co-axial with the center line Z—Z of the block 10, which center hole 12 is adapted to receive and have the strain element mounted therein. The small holes 11 are interconnected by means of the slots 13 and the small holes in turn are interconnected with the large center hole 12 by means of the slots 14. These slots also extend entirely through the body of the block transversely thereof, with the purpose of the aforementioned holes and the slots being to provide a massive parallelogramic structure which is more subject to deformation under load in one plane then it is in any other, the restraints of the parallelogram arrangement permitting movement in one direction only.

In the form shown, the block is designed to most readily yield to longitudinal horizontal components of force having a direction parallel to the X—X axis and lying in a plane paralleling the X—X, Z—Z axes such as that caused by a load L. Thus, the parallelogram flexure block 10 measures one component of force only, namely those parallel to the X—X axis referred to hereinafter as longitudinal components. The massive integral nature of the block 10 prevents significant deformation thereof by load components applied thereto from directions other than the longitudinal horizontal ones sought to be measured, such as components applied transversely or vertically thereof paralleling the Z—Z and Y—Y axes respectively and referred to hereinafter as transverse and vertical components. Thus, if a load is applied to the flexure block 10 having multiple components of force including a longitudinal component, the flexure will measure only said longitudinal component and will not measure the other transverse and vertical components.

In the form shown, the top section 10a of the flexure block is capable of moving parallel to the bottom section 10b thereof in a horizontal plane longitudinally of the block. Thus, any force applied to the top section 10a of the parallelogram flexure block such as the load L having a horizontal thrust component will cause the top section to move parallel to the bottom section when the bottom section is anchored against movement and cause a deformation or straining of the block which is proportional to the longitudinal load whereby the longitudinal component can be measured in accordance with the degree of strain or deformation. The sensitivity and range of deflection of the device can be varied as desired according to use. In practice the full scale deflections of the device are usually less then 0.003 inch.

To determine the strain caused by a longitudinal component such as that effected by the load L on the upper section 10a of the block, a strain element also formed from a single piece of metal such as steel is provided. In the balance shown in FIGS. 1 and 2, a strain element 15 is shown made from a single piece of metal. The strain element 15 has an upper portion 16 and a lower portion 17, the curved outer peripheral edges 16a and 17a of which are both formed on a radius of curvature corresponding to that of the large center hole 12 so as to enable the strain element 15 to be gently press fitted into place in the bore 12 in close fitting relationship therewith. The upper and lower portions 16 and 17 respectively are interconnected by means of a vertical elastic beam 18 which extends between and is integral with the upper and lower portions 16 and 17 at right angles thereto.

The beam 18 has upwardly inwardly tapered converging sides, providing a reduced upper neck portion. The upper section 16 is provided with an elongate cutout portion or slot 19 which extends transversely through the entire upper portion 16 immediately adjacent the point of juncture thereof with the beam 18 to provide narrow thin elongate horizontal flexible straps or arms 20 extending from opposite sides of the top of the beam 18 longitudinally of the block, which straps are adapted to yield in the vertical longitudinal plane relative to the beam when subjected to vertical components.

The longitudinal load supplied to the upper section 10a is carried to the beam 18 entirely through the straps 20 which are sufficiently flexible to assure negligible transmission of forces thereto other than those normal to the vertical neutral axis of the beam, the longitudinal forces transmitted to the beam causing bending thereof in the vertical longitudinal plane. Thus, only the moments of force which are directed parallel to the longitudinal X—X axis of the block and normal to the vertical (longitudinal) axis of the beam are transmitted to the beam through the straps 20 to cause bending of the beam and thereby permit measurement of the force. Any other moments of force have no significant effect on the beam and do not contribute to the bending thereof due to the restraints effected by the parallelogram arrangement of the block and the flexibility of the straps 20. Any vertical moments are absorbed by the straps 20 which bend or yield relative to the beam under the influence of these vertical moments and therefore, do not cause any bending of the beam.

When the strain element is installed and anchored in the central bore 12, the lower end of the beam 18 is, in essence, firmly anchored to the bottom portion 10b of the block and the top end of the beam is attached to the upper section 10a of the block only by the two straps 20. The ends of the upper sections 16 are also tapered upwardly slightly as at 16a to further increase the accuracy and sensitivity of the device.

To properly anchor the strain element 15 within the bore 12, the top and bottom portions of the block 10 are provided with vertical disposed holes which communicate with the bore 12, which holes in turn are in alignment with suitably tapped holes in the upper and lower sections of the strain element 15, which holes are adapted to receive and threadedly engage the locking cap screws 22 which firmly anchor the upper and lower sections 16 and 17 of the strain element 15 to the top section 10a and the bottom section 10b respectively of the block 10. The block is also provided with other tapped holes 23 which enable the bottom section to be anchored to suitable structure for anchoring the bottom section against movement and which enable the top section to be fastened to the means for applying the force or load or thrust to be measured to the top section.

Pairs of strain gauges 21 and 21' are mounted on opposite sides of the beam 18 so as to be sensitive to only those stresses resulting from bending of the beam in one particular plane, namely the vertical longitudinal plane in the form shown. These gauges are connected in a fully compensated normally balanced Wheatstone bridge circuit as a protection against zero drift and changes due to temperature.

The strain gauges may be of any suitable design. The ones shown in FIG. 10 consist of a thin wire 24 repeatedly bent back upon itself and mounted on a suitable backing 25 which is cemented to the sides of the beam. The four strain gauges provide the resistances R–1, R–2, R–3 and R–4 of the bridge circuit schematically shown in FIG. 9, said circuit having a constant voltage input $E_{in}$ and a voltage output $E_{out}$.

In operation, when the top section 10a of the block is subjected to a longitudinal load such as L, the top section 10a moves parallel to the bottom section 10b and deforms and places a load on the strain gauge element 15, with the longitudinal component of thrust to be measured being transmitted to the beam 18 through the thin narrow straps 20, thereby causing bending of the beam 18. The bending of the beam causes the pair of strain gauges 21 to be elongated and placed in tension and causes the other pair of strain gauges 21' to be pressed. The compression and tensioning of the strain gauges effects a change in the strain gauge resistances R–1, R–2, R–3 and R–4 which causes an unbalance in the bridge circuit proportional to the load applied to the flexure block and causes a resulting change in voltage output $E_{out}$, assuming a constant voltage input $E_{in}$. Measuring the change in the output voltage thus gives a measure of the strain which is proportional to the applied load.

From the foregoing, it will be appreciated that the balance described is designed to accurately measure components of force parallel to the X—X axis only. Components of force parallel to the transverse Z—Z axis are resisted and withstood by the parallelogram design and arrangement, and components of force parallel to the vertical Y—Y axis are absorbed by the flexible straps 20 and therefore, have no effect on the bending of the strain beam 18. The device has a high frequency response as a result of low deflection on the rated load which helps reduce resonance problems.

It will be further appreciated that the balance of this invention is particularly effective in those situations where it is desirable to make thrust measurements which produce too great a load deflection in presently available devices since the force balance of this invention is capable of a great range of load with only a minute degree of deflection for any particular load and yet is capable of measuring this deflection and the force causing same with a high degree of accuracy. The balance measures only the respective load for which it is designed and the balance unit shown will not measure side (transverse) or vertical forces since these latter forces will not deform the thrust balance flexure in a manner which will be registered by the beam of the strain gauge element.

Furthermore, because the number of separate components utilized to make up the force balance of this invention has been kept to a minimum, possible errors due to relative movement of the parts of each unit have been eliminated as much as possible. Elimination of movable joints from the design reduces error, prolongs life and keeps maintenance costs to a minimum.

It is also important to note that the method of making the force balance of this invention enables a highly sensitive and accurate unit to be constructed with a minimum of effort and expense. Thus, by making the flexure block out of a solid piece of steel by suitably boring and slotting it as previously indicated, the machining operations involved are relatively inexpensive and yet provide a high degree of accuracy with a minimum of labor and expense. Strain elements having different degrees of elasticity may be employed according to the load level to be measured. Thus, at lower load levels more elastic strain elements capable of producing higher outputs may be utilized, while at higher load levels, less elastic strain elements may be utilized capable of producing lower outputs at the higher load level.

This invention also provides means for selectively stiffening the flexure balance block 10 to materially extend the normal operating range of force measurement.

FIGS. 3 through 6 inclusive illustrate three different types of stiffening flexure elements capable of extending the range of measurement of the balance unit shown in FIGS. 1 and 2. FIG. 3 illustrates one form of stiffening flexure element referred to in the entirety by reference numeral 26. The stiffener 26 has similar upper and lower portions 27 and 27' respectively which are integrally interconnected by a pair of flexible beams 28. The outer peripheries 27a and 27a' of the upper and lower portions are formed on a radius corresponding to that of the bore 12 to enable the stiffener 26 to be lightly press fitted into the bore 12 whereby the outer peripheral portions 27a and 27a' engage the wall of the bore 12. As a result, the upper portion of the stiffener engages the upper section 10a of the balance block and the lower portion of the stiffener is in engagement with the lower section 10b of the block. The medial portions 27b of the outer peripheries of the upper and lower portions of hte stiffener may be recessed slightly if desired. The upper and lower portions of the stiffener are provided with suitably tapped holes which are in alignment with suitable holes bored in the block for threadedly receiving and engaging cap screws 29 for firmly anchoring the upper and lower portions of the stiffener to the upper and lower sections of the block respectively. When the stiffener 26 is press fitted into the bore 12 and firmly anchored therein by the cap screws 29, the stiffener increases the resistance to movement of the upper section 10a of the block under load whereby a given load applied to the upper section 10a of the block causes less movement of the upper section and less deformation of the strain element which is also mounted in the bore 12 as previously described then would be the case if the stiffener were not present.

FIG. 4 illustrates another type of stiffener 30 which is similar in design to the previously described stiffener 26 and includes the upper and lower portions 31 and 31' respectively interconnected by flexible beams 32 with the outer peripheral portions 31a and 31a' of the upper and lower portions respectivley being formed on a radius corresponding to that of the bore 12 to enable them to engage the walls of the bore 12, the peripheral portions 31a being adapted to engage the upper section 10a of the block and the lower peripheral portions 31a' being adapted to engage the lower section 10b of the block. The lower portion 31' is locked in place in the bore by a cap screw 29. The stiffener 30 differs from the stiffener 26 in that the upper portion 31 is provided with a tapered cutout portion or split 33 which extends through the entire thickness of the upper portion 31 to divide the upper portion into two parts. A wedge-shaped locking bolt 34 is provided which is adapted to be threadedly inserted through the upper section 10a of the block and enters the tapered split or cutout portion 33 to spread the two halves of the upper portion 31 and lock them into place in engagement with the wall of the bore 12. By loosening and backing off the locking bolt 34, the two halves of the upper portion 31 move away from and lose contact with the wall of the bore to return the unit to normal operating range and render the stiffener 30 ineffective. Thus, the stiffener 30 permits the unit to be selectively operated within the normal range or have its range extended by loosening or tightening the locking bolt 34 as desired without having to repeatedly remove and reinstall the stiffener.

FIGS. 5 and 6 illustrate still another form of stiffening element, indicated in the entirety by the reference numeral 35. The stiffener 35 includes a lower portion 36 and an upper portion 37, the outer peripheries 36a and 37a respectively thereof being formed on a radius corresponding to the radius of the bore 12 whereby these curved portions 36a and 37a will engage the walls of the bore when the stiffener is properly installed therewithin, the upper portion 37 being in engagement with the upper section 10a of the block and the lower portion 36 being in engagement with the lower section 10b of the block. The lower and upper sections 36 and 37 respectively are interconnected and joined by means of an upstanding tapered beam 38 which is joined at its lower end to the lower portion 36 of the stiffener and by means of a horizontal arm or strap 39 which extends between and is integral with the top of the beam 38 and the depending leg portion 37b of the upper portion 37, which strap is formed by the machining of the slot 37c in the upper portion 37. The strap 39 is sufficiently flexible to permit vertical flexing movement of the upper portion 37. Vertically disposed stop members 40 and 41 are provided for limiting the downward movement of the upper portion 37 and are located adjacent opposite ends of the upper portion 37 in spaced apart relationship with respect thereto, the member 40 being carried on the top of the beam 38, the other stop member 41 being carried by the lower portion 36. The lower portion 36 is anchored and locked in position in the bore by means of a cap screw 29.

The upper portion 37 is locked in place by means of a vertically extending threaded eye bolt 42 which is threadedly engaged at its lower end with the upper portion 37. The eye bolt 42 extends through a vertical opening or hole 43 in the upper section 10a of the block and is adapted for free longitudinal movement relative thereto. The eye portion 42a of the eye bolt which extends above the top of the block is operatively connected with a Morton cam 44 by means of a dowel 45 about which the cam 44 pivots. A spherical Morton washer 46 through which the eye bolt extends is mounted atop the block, with the cam 44 working against the top surface thereof. The lower end of the eye bolt carries a vertically extending rod 47 which extends through an opening 39a in the arm 39 for free vertical movement relative thereto. A spring element 48 is provided which is bent at substantially right angles to provide a horizontal and a vertical portion. Each end of the spring is provided with an eye 48a, with the vertical portion of the spring being anchored to the lower portion 36 of the stiffener by means of a machine screw 49 and the horizontal segment of the spring being fastened to the rod 47 by means of the nut 50 with the rod 47 passing through the eye portion 48a of the horizontal segment of the spring.

The spring 48 is suitably tensioned so that when the cam 44 is released by swinging the handle thereof upwardly, the spring will pull downwardly on the rod 47 and the eye bolt 42 thereby pulling the upper portion 37 of the stiffener downwardly whereby the stiffener loses contact with the walls of the block and is rendered inoperative. To render the stiffener operative and extend the range of the balance unit by stiffening the block, the cam 44 is actuated by pressing downwardly on the handle thereof, which camming action pulls the eye bolt 42 upwardly against the tension of the spring 48 and draws the upper portion 37 of the stiffener into cooperative engagement with the wall of the bore 12 thereby extending the operating range of the balance unit.

The block 10 of FIG. 6 is provided with suitable openings 51 for receiving strain elements, anchoring cap screws 22 previously mentioned to enable strain elements 15 to be mounted in the bore on opposite sides of the stiffener 35, the strain elements in FIG. 6 being shown in phantom outline only.

The balance units of this invention provide the most accurate results when they are balanced and symmetrical about all of the center lines. Thus, when a strain element is used alone, it is preferably located on the center lines of the block 10 as shown in FIGS. 1 and 2. When stiffening means are to be employed to extend the range of measurement of the unit, the stiffener elements and strain elements are preferably symmetrically arranged in the bore 12 to provide a balanced structure. Thus, a single stiffener may be mounted in the center of the bore and flanked on both sides by strain elements laterally equispaced therefrom, or a single strain element may be mounted in the center of the bore as shown in FIG. 2 and flanked on both sides by suitable stiffeners also equispaced from the strain element.

The stiffener 35 also has the advantage that it can be activated or deactivated to control the operating range of the balance unit without repeatedly removing and reinstalling same.

Another type of strain element is illustrated in FIGS. 7 and 8 and referred to in the entirety by the reference numeral 52. The strain element 52 is designed to be installed by press fitting into the center bore 12 of the block 10 in the same fashion as the previously described strain element 15. The strain element 52 is machined from a single piece of metal, preferably steel and includes the upper and lower semi-circular portions 53 and 54 respectively. The outer peripheral portions 53a and 54a of the upper and lower portions respectively are formed on the substantially same radius as the radius of the bore 12 of the block to permit the strain element to be press fitted into the bore in contact with the walls thereof, with the upper portion 53 being engaged with the upper section 10a of the block and the lower portion 54 being engaged with the lower portion 10b of the block. The medial portions of the outer periphery of the upper and lower portions may be slightly recessed as at 53b and 54b respectively. The upper and lower portions of the strain element 52 are also provided with suitably threaded holes 55 for receiving and threadedly engaging the anchoring cap screws 22 to lock the strain element in the bore of the block. The lower portion 54 is provided with inwardly and transversely extending elongate slots 56, the inner ends of which are in spaced apart relation to define the narrow transversely extending rigid neck 57 which integrally interconnects the upper and lower portions of the strain element. The upper portion 53 is provided with an elongate transversely extending slot 58 immediately adjacent the neck 57, the slots 56 and 58 defining therebetween the thin narrow arms or straps 59 and 59' which are flexible in nature and adapted for movement in a vertical longitudinal plane relative to the neck 57 when subjected to vertical components. The straps are longitudinally aligned with the transverse center line Z and radial axis of the strain element which in turn is in axial alignment with the transverse center line Z—Z of the block when installed therein.

Strain gauges 60 and 60' corresponding to the previously described strain gauges 21 and 21' are arranged in pairs on each of the straps 59 and 59' respectively and cemented to the top and bottom faces thereof as shown and connected in a balanced fully compensated Wheatstone bridge circuit corresponding to that shown in FIG. 9 to measure the load in response to the deformation of the strain element caused thereby. As in the strain element 15, the longitudinal moments of force are transmitted entirely through the straps 59 and 59' and are applied to the strain element 52 at the transverse axis Z. A load so applied causes longitudinal axial tensioning of one of the straps and the strain gauges carried thereon and longitudinal axial compression of the other strap and strain gauges carried thereon. Thus, if the load is applied from the left side as viewed in FIG. 7, the strap 59 and the strain gauges 60 carried thereon will be placed in tension and the strap 59' and the strain gauges 60' carried thereon will be placed in compression, thereby causing a change in the resistances R–1 through R–4 of the bridge circuit, thereby causing an unbalance in the bridge circuit proportional to the load applied to the block with the unbalance being reflected as a change in the output voltage of the bridge. Thus, in the strain element 15 the deformation of the strain gauges is caused by the bending of the beam 18 and corresponding bending of the strain gauges mounted on the sides thereof, whereas in the strain element 52 the deformation of the strain gauges is an axial elongating tensioning of two of the strain gauges and an axial compression of the other two strain gauges.

Also, as in the strain element 15, the flexibility of the straps 59 and 59' relative to the neck 57 absorbs or dampens any vertical components of force paralleling the Y—Y axis of the block to prevent their causing any significant deformation of the strain gauges.

Thus, in both of the strain elements shown, the straps 20 and 59–59' and their respective beam 18 and neck 57 are adapted for pivotal movement relative to each other about the transverse axis located at the point of juncture between said straps and their respective beam or neck, which axis in strain element 15 is identified as W, and in strain element 52 is identified as Z. Thus, in the forms shown, the upper portion of each strain element pivots or tilts about said axes relative to the lower portion when subjected to vertical components of force. It should be noted that the balances shown will function the same and produce the same results if the top section of the block is anchored against movement and the load to be measured is applied to the bottom section.

It will, of course, be understood that various changes may be made in the form, details, arrangement and proportions of the various parts without departing from the scope of our invention.

What we claim is:

1. A force measuring device comprising flexure structure having opposed portions capable of relative parallel movement therebetween, means interconnecting said portions and resisting said relative movement therebetween, said means including an elongate strain member lying in a plane parallel to the plane of said relative movement whereby the force required to effect said movement is transmitted to a given point on said strain member intermediate the ends thereof, said member being axially deformed in said plane in proportion to said force, the portion of said member on one side of said point being placed in tension by said force, the portion of said member on the other side of said point being placed in compression by said force, and strain gauge means mounted on both of said portions of said member and deformable therewith and capable of measuring said force in accordance with the degree of said deformation.

2. A force measuring device comprising four sided parallelogramic flexure structure having opposed portions capable of relative parallel movement therebetween, strain means other than said structure interconnecting said opposed portions and adapted to be deformed by said movement in proportion to the force effecting said movement, gauge means engageable with said strain means in response to said deformation thereof and capable of measuring the force required to effect said relative movement in accordance with the degree of deformation of said strain means occasioned thereby, and stiffening means other than said structure adapted for connection to both of said opposed portions and capable of yieldingly resisting said relative movement and thereby increasing the resistance to relative movement between said portions to increase the range of force measurement of said device, said stiffening means being releasable from operative engagement with one of said portions while remaining operatively engaged with the other of said portions to return same to normal operating range.

3. A force measuring device comprising an integral parallelogramic flexure made from a block of rigid material, one side of said flexure being adapted for longitudinal movement parallel to its opposing side, a strain element not constituting one of the sides of said structure extending between and interconnecting said opposing sides and adapted to be strained by said movement in proportion to the force causing same, and strain gauge means sensitive to the degree of said strain and capable of measuring said force in accordance therewith, the other opposing parallel sides of said flexure being sufficiently rigid to prevent any significant deformation of said one side by a co-planar force applied normal thereto, and including stiffening means not constituting one of the sides of said structure adapted to extend between and interconnect said first named opposing sides to increase the resistance to movement of said one side and extend the range of force measurement of said device, said stiffening means being releasable from operative engagement with at least one of said sides to render said stiffening means inoperative.

4. A force measuring device comprising an integral parallelogramic flexure made from a block of rigid material, one side of said flexure being adapted for longitudinal movement parallel to its opposing side, a T-shaped strain element extending between and interconnecting said opposing sides, the leg portion of said element being generally normal to said sides and having its free end anchored to said opposing side, the arm portion of said element being disposed parallel to said sides and to the direction of movement and normal to said leg portion and having the ends thereof anchored to said one side for transmitting a force applied to one side longitudinally thereof to the point of juncture between said leg and arm portions in a direction normal to said leg and parallel to said arm, one of said portions being adapted to be strained by said force in proportion thereto, strain gauge means mounted on said strained portion and strained therewith for measuring said force in accordance with the degree of strain, said arm portion being adapted for pivotal movement relative to said leg portion about an axis normal to both said arm and leg portions when acted on by forces applied to said one side in a direction normal to said side and said direction of movement thereof to prevent significant deformation of said strained portion and measurement of said last named forces, the other opposing sides of said flexure being sufficiently rigid to prevent any significant deformation of said one side by a co-planar force applied normal thereto and measurement of said last named force by said gauge means.

5. A force measuring device comprising flexure structure providing opposed sides, one of said sides being adapted for longitudinal movement parallel to its opposing side, a T-shaped strain element extending between and interconnecting said opposing sides, the leg portion of said element being generally normal to said sides and having its free end anchored to said opposing side, the arm portion of said element being disposed parallel to said sides and to the direction of movement and normal to said leg portion and having the ends thereof anchored to said one side for transmitting a load supplied to said one side longitudinally thereof to the point of juncture between said leg and arm portions in a direction normal to said leg and parallel to said arm, one of said portions being adapted to be strained by said force in proportion thereto, strain gauge means mounted on said strained portion and strained therewith for measuring said force in accordance with the degree of strain, said arm portion being adapted for pivotal movement relative to said leg portion about an axis normal to both said arm and leg portions when acted on by forces applied to said one side in a direction normal to said side and said direction of movement thereof to prevent significant deformation of said strained portion and measurement of said last named force.

6. In force balances, a flexure comprising a solid symmetrical steel block having a bore extending therethrough co-axial with one center line of said block and additional bores parallel to said first named bore extending therethrough, and slots extending between and communicating with and interconnecting all of said bores whereby said block is divided into two pairs of opposing parallel sides forming a parallelogram type flexure in which two opposing sides are adapted for relative parallel movement therebetween in one direction only, a strain element mounted within said first named bore extending between and interconnecting said last named opposing sides and adapted to be strained by said relative movement in proportion to the force causing same, and strain gauge means mounted on said strain element and sensitive to the degree of strain for measuring said force in accordance therewith.

7. A force measuring device comprising spaced apart members, one of which is to be anchored against movement thereof, an elongate element extending between said members having one end thereof secured to one of said members, a pair of elongate longitudinally aligned strap elements having their opposing ends secured to said first named element adjacent the other end thereof and extending perpendicularly therefrom in opposite directions, the other ends of said straps being secured to said other member, said straps and first named element being adapted for relative pivotal movement therebetween about an axis normal to the longitudinal axes of said first named element and said straps, one of said elements being adapted to be strained in proportion to a force applied to the unanchored member in a direction parallel to the longitudinal axes of said straps, strain gauge means mounted on said strained element and strained therewith for measuring said force in accordance with the degree of said strain, said relative pivotal movement taking place when a force is applied to one of said members in a direction normal to the longitudinal axis of said straps and parallel to the longitudinal axis of said first named element to prevent straining of said elements by said last named force and measurement thereof by said gauge means.

8. A force measuring device comprising spaced apart members, an elongate beam element extending between said members and perpendicular thereto having one end thereof secured to one of said members, a pair of elongate longitudinally aligned flexible straps having their opposing ends secured to said beam element adjacent the other end thereof and extending perpendicularly therefrom in opposite directions, the other end of said straps being secured to said other member for transmission of forces applied to said other member in a direction parallel to the longitudinal axes of said straps to said beam element for bending of said beam in proportion to said force, strain gauge means mounted on said beam element to be strained by the bending thereof for measuring said force in accordance with the degree of strain caused by said bending, said straps being adapted for pivotal movement relative to said beam about an axis perpendicular to the longitudinal axes of said straps and said beam whereby forces applied to said other member in a direction perpendicular to said straps and parallel to the longitudinal axis of said beam cause pivotal movement of said other member and said straps about said pivot axis and prevent deformation of said beam by said force.

9. A force measuring device comprising spaced apart members, a rigid element extending between said members and anchored to one of said members, a pair of elongate longitudinally aligned straps having their opposing ends secured to said element and extending therefrom in opposite directions, the other ends of said straps being connected to the other of said members and adapted for pivotal movement relative to said element about an axis normal to the longitudinal axes of said first named element and said straps when a first force is applied to said other member in a direction normal to the longitudinal axes of said straps and parallel to the longitudinal axis of said first named element to prevent straining of said element and said straps, said straps being adapted to be strained longitudinally thereof by a second force applied to either of said members in a direction parallel to the longitudinal axes of said straps when the member not receiving said second force is fixed against movement, and strain gauge means mounted on said straps for measuring said force in accordance with the degree of said strain.

10. In a force balance including opposed portions adapted for relative parallel movement therebetween in a given direction, means extending between and interconnecting said portions and strained by said relative movemet, and gauge means responsive to said strain for measuring the force effecting said movement and strain in accordance with the degree of said strain, means for extending the range of measurement of said balance comprising a pair of resilient stiffening members adapted to extend between said portions, means for anchoring one end of said members to one of said portions, the other ends of said members being in disconnected laterally spaced apart opposed relationship with respect to each other, and wedge-shaped anchoring means adapted for insertion between said other ends to spread them apart and lock them in cooperative engagement with said other portion to yieldingly resist said relative movement between said portions and increase the range of measurement of said balance, said last named anchoring means being further adapted for withdrawal from between said members thereby releasing said members from stiffening engagement with said other portion and returning the balance to its normal operating range.

11. In a force balance including opposed portions adapted for relative parallel movement therebetween in a given direction, means extending between and interconnecting said portions and strained by said relative movements, and means responsive to said strain for measuring the force effecting said movement and strain in accordance with the degree of said strain, means for extending the range of measurement of said balance comprising a first member adapted to engage one of said portions, a second member adapted to engage the other of said portions, a resilient stiffening beam anchored to one of said members and extending towards the other member, a flexible arm having one end secured to said beam adjacent the unanchored end thereof and disposed substantially perpendicular thereto, the other end of said arm being anchored to said other member whereby said members are resiliently interconnected for movement away from each other into cooperative stiffening engagement with said portions and for movement towards each other to withdraw said members from stiffening engagement, spring means continuously biasing said members towards each other, and releasable means for pulling said members apart and locking them in stiffening engagement with their respective portions, said beam providing yielding resistance to said relative movement between said portions and extending the range of measurement of said balance.

12. A force measuring device comprising a flexure member formed from a solid block of steel having parallel side sections interconnected by parallel end sections, said side and end sections defining a parallelogramic type flexure in which the sides lie in parallel planes and are adapted for parallel movement relative to each other only in a single directional line generally normal to said end sections, the rigidity of said block preventing relative parallel planar movement between said sides in a direction parallel to the end sections, said block having a bore extending therethrough co-axial with the center line of said block disposed parallel to the planes of both the sides and the ends, half of said bore being defined by each of the sides, and a strain member mounted within said bore comprising spaced apart portions one of which is engageable with one side and the other engageable with the other side, means for locking said portions in cooperative engagement with their respective sides, an elongate element having one end anchored to one of said portions and extending towards said other portion with the other end of said element spaced apart therefrom, an elongate strap element secured to said other end of said elongate element and extending perpendicularly from opposite sides thereof and disposed normal to the center line of the bore, the outer ends of said strap element being anchored to said other portion, said elements being adapted for relative pivotal movement therebetween about an axis perpendicular to both said elements whereby a force is applied to said sides in a direction normal to the plane thereof whereby straining of said elements is prevented, one of said elements being adapted to be strained by and in proportion to a force applied to one of said sides in the plane thereof and parallel to said strap and said single directional line of movement, a portion of said element being placed in tension and a portion thereof in compression by said strain, and strain gauge means mounted on said strained element for simultaneous tensioning and compressing thereof by said strain for measuring said last named force in accordance with the degree of said strain.

13. A force measuring device comprising four sided parallelogramic flexure structure having opposed portions capable of relative parallel movement therebetween, strain means not constituting one of the sides of said structure interconnecting said opposed portions and adapted to be deformed by said movement in proportion to the force causing same, gauge means engageable with said strain means and responsive to said deformation thereof and capable of measuring the force required to effect said relative movement in accordance with the degree of deformation of said strain means occasioned thereby, and stiffening means not constituting one of the sides of said structure adapted for engagement with both of said opposed portions, said stiffening means when engaged with both of said opposed portions increasing the resistance to relative movement therebetween and thereby increasing the range of force measurement of said device, said stiffening means being capable of being released from operative engagement with at least one of said portions to return said device to normal operating range.

14. A force measuring device comprising spaced apart members, one of which is to be anchored against movement thereof, the other member being adapted for movement relative to the anchored member, a strain element extending between and interconnecting said members and adapted to be strained by the movement of said movable member, said strain element comprising two elongate portions joined together in perpendicular relationship to each other, one of said portions being secured to one of said members, the other portion being secured to the other of said members, said portions being capable of relative pivotal movement therebetween about an axis normal to the longitudinal axes of both of said portions, one of said portions being adapted to be strained in proportion to a force applied to the movable member causing movement of said movable member in a direction parallel to the longitudinal axis of one of said portions, said strained portion having tensioned and compressed sections, strain gauge means mounted on the tensioned and compressed sections of said strained portion which are tensioned and compressed therewith for measuring said force in accordance with the degree of said strain, said relative pivotal movement taking place when a moment of force is applied to said movable member in a direction normal to said first named direction and one of said portions and parallel to the other portion to prevent a strain being applied to said strained portion by said moment of force and measurement thereof by said gauge means.

References Cited by the Examiner

UNITED STATES PATENTS

| | | | |
|---|---|---|---|
| 2,597,751 | 5/52 | Ruge | 73—88.5 |
| 2,859,613 | 11/58 | Green | 73—141 |
| 2,997,875 | 8/61 | Moore | 73—141 |
| 3,004,231 | 10/61 | Laimins | 338—5 |

FOREIGN PATENTS 1,228,866   3/60   France.

RICHARD C. QUEISSER, *Primary Examiner.*

ROBERT EVANS, JOSEPH P. STRIZAK, *Examiners.*